United States Patent [19]

Scheve

[11] Patent Number: 4,715,137
[45] Date of Patent: Dec. 29, 1987

[54] ILLUMINATED DISPLAY WITH BEADED LIGHT-TRANSMITTING IMAGE

[76] Inventor: William J. Scheve, N5 W31797 Shagbark Glen, Delafield, Wis. 53018

[21] Appl. No.: 825,026

[22] Filed: Jan. 31, 1986

[51] Int. Cl.$^4$ .............................................. G09F 13/18
[52] U.S. Cl. ........................................ 40/546; 40/542
[58] Field of Search ................ 40/546, 545, 541, 542, 40/543, 544, 547, 594, 615, 582, 583, 612

[56] References Cited

U.S. PATENT DOCUMENTS

| | | | |
|---|---|---|---|
| 1,364,916 | 1/1921 | Carse | 40/546 |
| 1,654,370 | 12/1927 | Goetschius | 40/542 |
| 1,805,798 | 5/1931 | Bedrossyan | 40/541 |
| 2,082,724 | 6/1937 | Shelor | 40/546 |
| 2,091,342 | 8/1937 | Van Bloem | 40/546 X |
| 2,297,851 | 10/1942 | Wyss, Jr. | 40/546 X |
| 2,910,792 | 11/1959 | Pfaff, Jr. | 40/542 X |
| 2,917,838 | 12/1959 | Neugass | 40/546 X |
| 3,000,774 | 9/1961 | Swedlow et al. | 40/546 X |
| 3,131,496 | 5/1964 | Schropp | 40/547 |
| 3,510,976 | 5/1970 | Pauline et al. | 40/542 X |

FOREIGN PATENT DOCUMENTS

| | | | |
|---|---|---|---|
| 47168 | 3/1933 | Denmark | 40/542 |
| 10697 | 1/1977 | Japan | 40/546 |
| 786263 | 11/1957 | United Kingdom | 40/542 |
| 1044351 | 9/1966 | United Kingdom | 40/546 |

Primary Examiner—Robert Peshock
Assistant Examiner—J. Hakomaki
Attorney, Agent, or Firm—Quarles & Brady

[57] ABSTRACT

The present invention provides an illuminated display which includes a light-transmitting member having at least one face, a light source adjacent to the member, and an image applied to the face. The image is formed by adhering a plurality of light-transmitting particles to the face by means of a light-transmitting adhesive in the shape of the image, whereby, when the light source is lit, the image appears to be brighter than the rest of the light-transmitting member.

14 Claims, 6 Drawing Figures

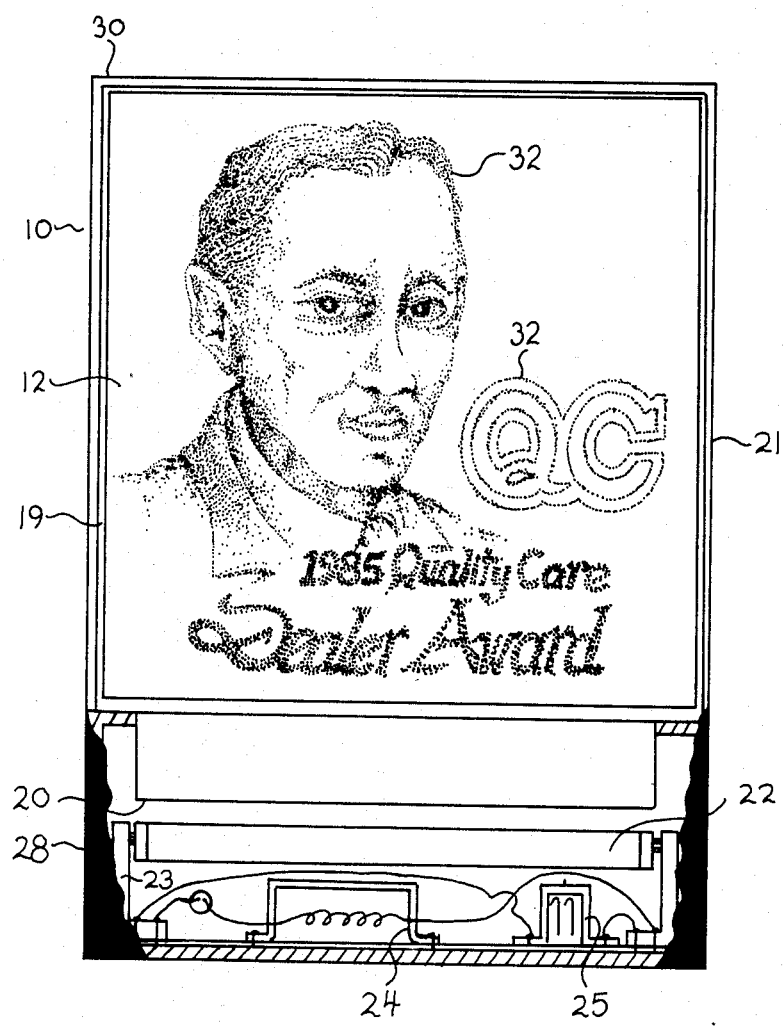
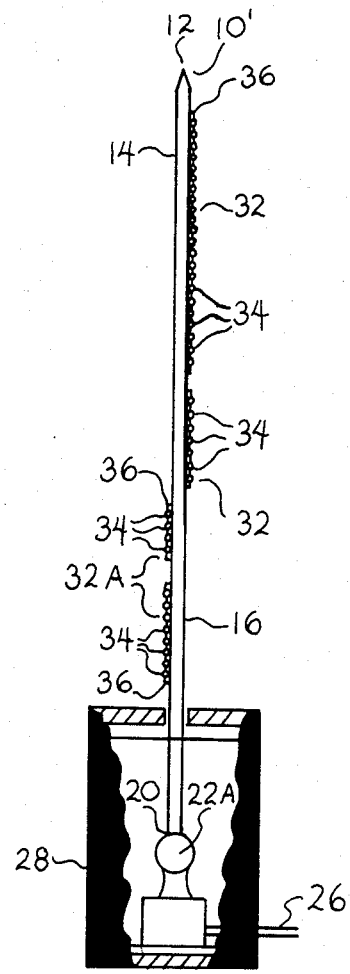
Fig. 2.
Fig. 5.

ILLUMINATED DISPLAY WITH BEADED LIGHT-TRANSMITTING IMAGE

BACKGROUND OF THE INVENTION

This invention relates to illuminated displays formed from light-transmitting materials.

In the past, designs or symbols have been etched, engraved, or otherwise cut into the surface of glass, acrylic, or other light-transmitting members, and a light source has been put adjacent to the light-transmitting member to form an illuminated display. The visual effect is that the engraved or etched image appears to be brighter than the rest of the member and appears to be floating in space. This technique has been used for point-of-sale advertising, awards, artwork, and so forth.

While the image formed by this illuminated display is very attractive and appealing, the prior art displays have a number of disadvantages. First, the engraving process is quite expensive. A solution to this problem has been to injection mold the light-transmitting member so that the design is molded into the material and does not have to be cut into it. However, tooling and set-up costs are expensive, and it is generally necessary to make a run of at least one thousand pieces (usually over 20,000 pieces) in order to recover the tooling costs. In addition, the time required to make the tooling and set up the molding process causes a delay in turn-around time.

Further, the engraving, or molding techniques cannot create half-tones or shades of gray which are necessary for reproducing photographs of the human face, landscapes, and other three-dimensional images. Etching techniques can be used to create half-tone images, but they do not transmit light as brilliantly as the construction of the present invention.

If a colored image is desired, it is known in the art to use a colored acrylic material or a colored light source or to adhere a strip of colored material to the edge of the acrylic which comes into direct contact with the light source. However, it is not possible under known methods to make a multicolored image.

SUMMARY OF THE INVENTION

My present invention provides an illuminated display which has the advantage of being much less expensive to manu facture than the engraved or injection molded displays of the prior art and of being economical for manufacturing any number of units. Thus, a large production run is not required to economically produce the displays of the present invention, as is the case with illuminated displays made by the injection molding process. Special tooling is not required to produce my new displays, so that the turn-around time is much faster as compared to prior displays. In addition, the display of the present invention can include half-tones or shading in order to recreate photographs or other three-dimensional images, such as the human face or landscapes. The display of the present invention can include multicolored images, another advantage over the prior art.

In order to achieve the aforementioned advantages, the present invention provides an illuminated display which includes a light-transmitting member having at least one face, a light source adjacent to the member, and an image applied to the face of the light-transmitting member. The image comprises a plurality of light-transmitting particles adhered to a layer of light-transmitting adhesive in the shape of the image, whereby, when the light source is lit, the image appears to be brighter than the rest of the light-transmitting member.

The present invention also provides a method for making an illuminated display, including the steps of applying a light-transmitting adhesive in the configuration of the desired image to a surface of a light-transmitting member, applying a plurality of light-transmitting particles onto the adhesive, and locating the light-transmitting member adjacent to a light source.

BRIEF DESCRIPTION OF THE DRAWINGS

FIG. 2 is a front view partly in section and with portions broken away of the illuminated display of FIG. 1.

FIG. 5 is a side sectional view with portions broken away of a second embodiment of the invention.

DESCRIPTION OF THE PREFERRED EMBODIMENT

Figure 4:
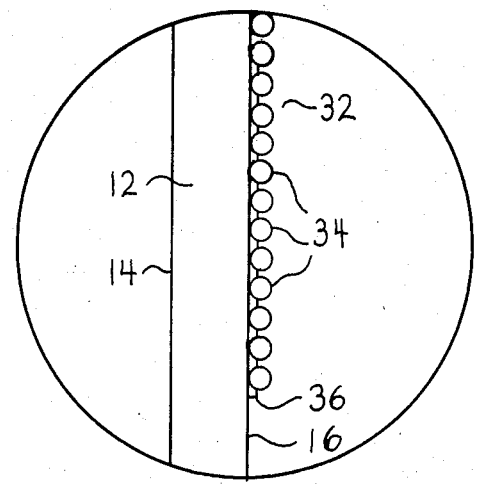
FIG. 4 is an enlargement of a portion of the light-transmitting member shown in FIG. 3.
Figure 1:
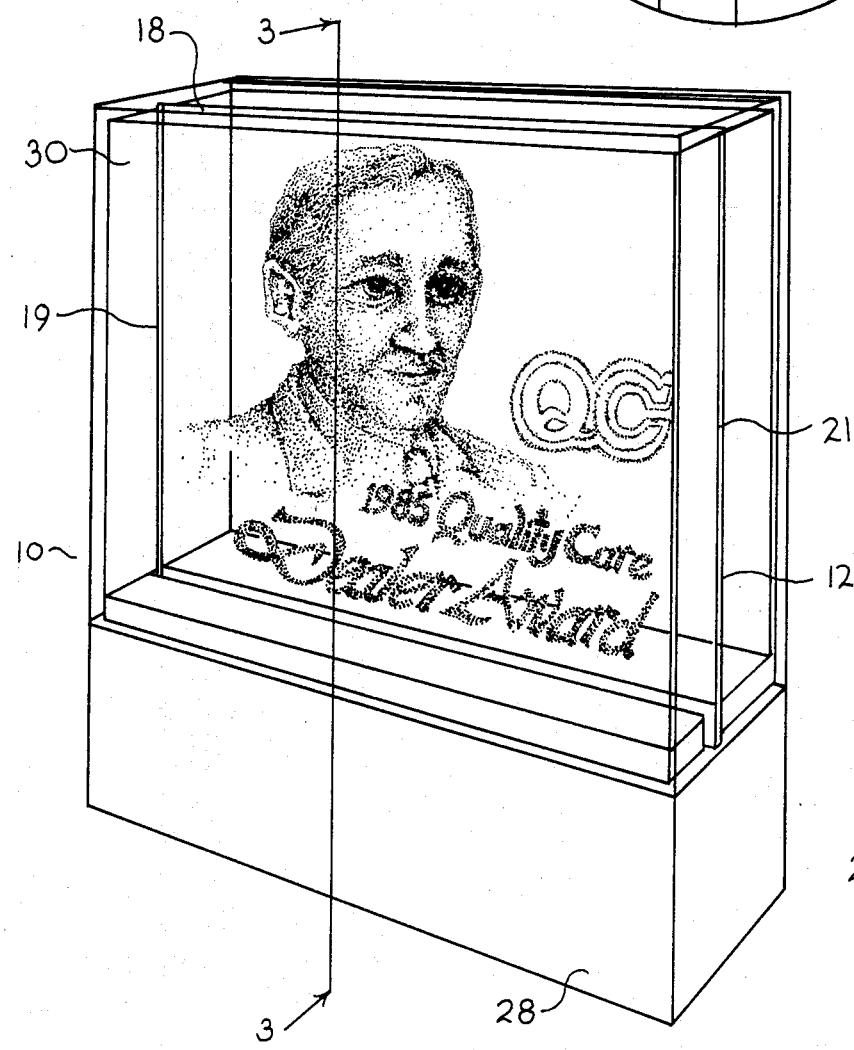
FIG. 1 is a perspective view of an illuminated display made in accordance with the present invention.
Figure 3:
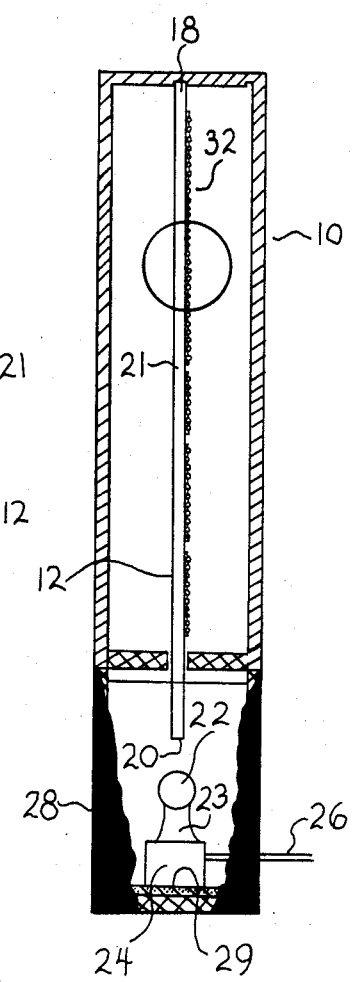
FIG. 3 is a side sectional view partly broken away of the illuminated display of FIG. 1.

As shown in FIGS. 1–4, the illuminated display 10 includes a light-transmitting member 12 which has smooth front and back surfaces 14, 16. The edges 18, 19, 21 of the member 12 may be beveled, polished, or otherwise treated to help reflect light, and the bottom edge 20 may be polished in order to improve the brightness of the image. The thickness of the light-transmitting member 12 also affects the brightness of the image, and, for that reason, is useful to have a light-transmitting member 12 which is at least ¼ inch thick. The light-transmitting member 12 may comprise a glass or plastic panel. Below the light-transmitting member 12 is a light source 22, which, in this case, is a fluorescent bulb. The light source 22 is adjacent to the bottom edge 20 of the light-transmitting member 12. Other elements associated with the fluorescent light 22 include a lampholder 23, a ballast 24, a starter 25 and a standard electrical cord 26. An opaque shroud 28 encases the light source 22. The shroud 28 may have a white or other reflective inside surface 29 so that most of the light is directed into the edge 20 of the light-transmitting member 12. The upper portion of the display 10 is encased by a transparent shroud 30, which protects the light-transmitting member 12 against scratching or other damage and enhances the appearance of the display 10. The back surface 16 of the light-transmitting member 12 carries the image 32. The image may be simply a line image, as are the words "Quality Care" on the image shown in FIGS. 1 and 2, or the image may include half-tones and shading, as in the portrait also included in those figures.

Whereas, in the prior art, the image 32 was cut, engraved, etched, or molded into the face 16 of the light-transmitting member 12, in accordance with the present invention a layer of light-transmitting adhesive 36 in the configuration of the image 32 is applied to the face 16 and a plurality of light-transmitting particles 34 are adhered to the layer of light-transmitting adhesive 36. The particles 34 may be clear-glass beads or glass chips, colored-glass beads, plastic beads or chips, diamond chips, resin granules, or other particles of light-transmitting material of any size, depending upon the detail and size of the image. For a finely detailed image, such as the portrait shown in the figures, particles having a diameter in the range of 0.04 to 1.0 millimeters are useful. The adhesive 36 is applied to the face 16 in the pattern of the image by any known technique. The adhesive may be applied by various commonly practiced industrial techniques: direct brush application by hand; applied by offset lithography; sprayed through a mask; stencil printing; roller coated by hand or mechanically; printed by gravure, rubber stamp or rubber plate techniques; and so forth. The preferred method for applying the light-transmitting adhesive where the image 32 is a detailed image, and particularly in cases in which the image requires half-tones, is to apply the adhesive by silk-screening. The silk-screening process is described in detail in the book *Graphic Communications* by Richard J. Broekhuizen, 1973, McKnight Publishing Company, Bloomington, Ill. 61701, pages 182–219, hereby incorporated by reference. In the preferred method, a half-tone film positive is made of the image in the desired size, placed against the photosensitive emulsion on the underside of a silk screen supported in a frame and then exposed to light, following which the unexposed emulsion is washed away to form a photosensitized silk screen likeness of the image 32. A thin bead of light-transmitting adhesive, such as "Naz-Dar" 500-bead adhesive series, number 2037, is applied to the top edge of the prepared silk screen, the screen is then lowered over the light-transmitting member 12, and a squeegee is used to pull the adhesive over the entire surface of the silk screen as evenly as possible to force adhesive through the silk screen and provide a layer of light-transmitting adhesive 36 in the configuration of the image 32 on a surface of the light-transmitting member 12. The light-transmitting member 12 is then removed, and the beads or particles 34 are applied over the adhesive 36 by hand-sprinkling, sifting, or cascading over the surface 16. The member 12 is then allowed to dry. After drying, all excess particles are removed by tipping the printed piece on its edge and tapping it lightly. Any remaining loose particles can then be removed by carefully using an air hose. At this point, a clear protective coating may be silk-screened or sprayed over the back surface 16. After the image 32 has been applied, the light-transmitting member 12 may be encased in the clear shroud 30 and installed over the light source 22, which is directed toward an edge 20 of the light-transmitting member 12.

Once the image 32 is applied to the light-transmitting member 12, and the illuminated display 10 is assembled as described above, the light source 22 is illuminated, and, to an observer looking at the display 10, the image 32 appears to be brighter than the rest of the light-transmitting member 12.

If it is desired to provide a colored image 32, color may be added by silk-screening a layer of transparent color onto the light-transmitting material 12; transparent dyes may be added to the adhesive 36 before applying the adhesive; or individually-colored particles 34 may be used. For a multicolored image, colored particles 34 or transparent dyed adhesive 36 may be applied in sections of different colors to various areas of the light-transmitting member 12 to form the image 32.

A second illuminated display 10' according to the present invention is shown in FIG. 5. This embodiment differs from the first embodiment in that, in addition to the image 32 which is carried on the back face 16 of the light-transmitting member 12, an image 32A is also applied to the front surface 14 of the light-transmitting member 12 by means of a light-transmitting adhesive 36. Also, the light source 22A, in addition to being adjacent to the edge 20 of the light-transmitting material 12, is actually in contact with the bottom edge 20. Having the fluorescent bulb 22A in contact with the edge 20 tends to provide a brighter image than in the first embodiment, where there is an air space between the edge 20 and the light source 22.

Figure 6:
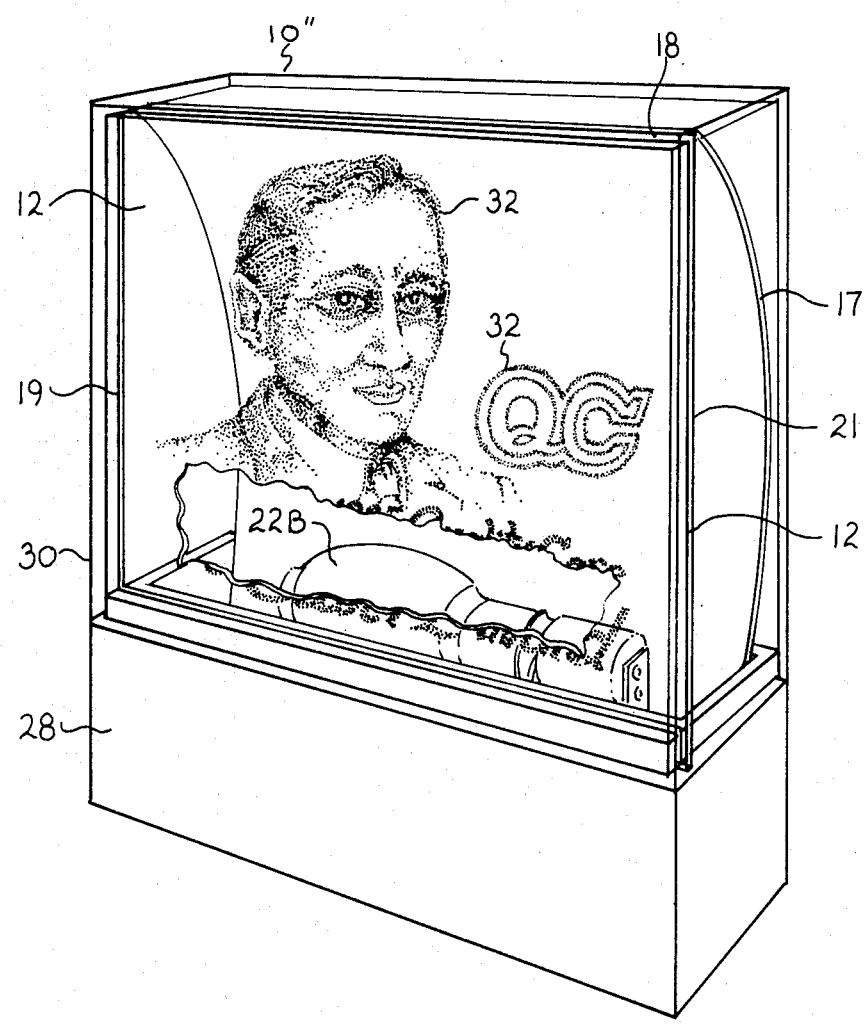
FIG. 6 is a perspective view partly broken away of a third embodiment of the invention.

FIG. 6 shows a third illuminated display 10" according to the present invention in which the light source 22B, illustrated as comprising a quartz lamp, is not adjacent to an edge of the light-transmitting member 12, but, instead, lies behind the image 32 which is carried on the back face 16 of the light-transmitting member 12. A reflector 17 directs the light onto the light-transmitting member 12; the light is transmitted through the light-transmitting member 12, adhesive 36 and particles 34; again, the image 32 appears brighter than the rest of the light-transmitting member 12 when the light source 22B is illuminated. The light source in the display 10' may also be positioned behind the center of member 12 without being visible to an observer when the image 32 on the member 12 comprises a transparent or light-transmitting image 32 surrounded by a layer of opaque material.

The light-transmitting adhesive 36 of the displays described above can be any material which is capable of bonding to the member 12 and to the light-transmitting particles 34 and also capable of being applied to the member 12 in the form of a selected image. The adhesive may comprise an adhesive composition of synthetic polymers, such as alkyd or acrylic resins, that is light-transmitting. Also, the light-transmitting adhesive 36 can be a clear or transparent material such as a urethane coating, or varnish or paint coating, that will meet the foregoing criteria, and the term "light-transmitting adhesive" as used in the description and the claims is defined to include such materials. The light-transmitting adhesive 36 need not be applied in liquid form; instead, it may be a light-transmitting sheet with light-transmitting adhesive on both sides which is die cut to the configuration of the image.

The teachings of the present invention can be employed to provide illuminated displays other than the three specific embodiments and various alternatives described above. For example, two or more light-transmitting members can be incorporated in an illuminated display, each member having a different image to provide special effects. Displays according to the present invention may be designed as a table, desk or counter display, a wall mounted display, or a ceiling hung illuminated display. Also, the light-transmitting member 12 need not be a flat sheet member as illustrated in the embodiments described above, and light-transmitting members of other shapes can be used to provide an illuminated display according to the present invention. For example, the member 12 may include a sheet of material thermoformed to have a three-dimensional image, and the light-transmitting adhesive and light-transmitting particles can be applied over the three-dimensional image. The member 12 also may include a photograph surrounded by an image formed of light-transmitting adhesive and particles as a frame for the photograph or combined with a beaded image presenting text matter associated with the photograph; also, specific sections of the photograph can be covered with light-transmitting adhesive and particles to provide special effects such as highlighting certain areas. An illuminated display using a light source and reflector as in display 10″ can include a transparency mounted on the member 12 as a means of combining photographic material and an image of the present invention.

The light-transmitting member 12 will usually have a smooth surface on which the image is formed, but the surface may also be textured to provide a unique effect. The light-transmitting member 12 can be illuminated by a light source which is adjacent to an inner edge of the member 12 (i.e., an edge formed by drilling a hole through the member 12) instead of a light source adjacent to an outer edge or to the back of the member 12 as shown. A backing element such as a sheet of colored or black material, a mirror or a graphic panel may be placed behind the light-transmitting member 12 and behind the image 32 to provide a contrast between the bright image 32 and the backing material. The illuminated displays of the present invention can be used for many purposes, such as, for example, advertising displays, point-of-sale displays, trophies and awards, signs, and artwork.

It will be obvious to those skilled in the art that other modifications may be made to the aforedescribed embodiments without departing from the spirit and scope of the present invention.

I claim:

1. An illuminated display, comprising:
    a light-transmitting member having at least one face;
    a light source adjacent to the light-transmitting member;
    an image applied to the face of the light-transmitting member comprising a layer of light-transmitting adhesive in the shape of the image adhered to the face and a plurality of light-transmitting particles adhered to the adhesive, whereby, when the light source is lit, the image appears to be brighter than the rest of the member.

2. An illuminated display as recited in claim 1, wherein the light-transmitting member has at least one edge and wherein the light source is adjacent to that edge.

3. An illuminated display as recited in claim 2, wherein the light source is in contact with the edge.

4. An illuminated display as recited in claim 1, wherein the light source is behind the light-transmitting member and transmits light through the light-transmitting particles.

5. An illuminated display as recited in claim 4, and further comprising a reflector behind the light source to direct the light onto the light-transmitting member.

6. An illuminated display as recited in claim 1, wherein the image is applied to the front face of the light-transmitting member, and further comprising a light-transmitting cover located in front of the image.

7. An illuminated display as recited in claim 1, wherein the light-transmitting member is at least ¼ inch thick.

8. An illuminated display as recited in claim 1, wherein the light-transmitting particles include particles of various colors to create a multi-colored image.

9. An illuminated display as recited in claim 1, wherein the light-transmitting adhesive is colored to create a colored image.

10. An illuminated display as recited in claim 1, 2, 3, 4, 5, 6, 7, 8, or 9, wherein the light-transmitting particles have a diameter in the range of 0.04 to 1.0 millimeters.

11. A method for making an illuminated display, comprising the steps of:
    applying a light-transmitting adhesive to a surface of a light-transmitting member in the configuration of a selected image;
    applying a plurality of light-transmitting particles onto the adhesive so that the particles become adhered to the surface of the light-transmitting member in the configuration of the image; and
    providing a light source adjacent the light-transmitting member.

12. A method for making an illuminated display as recited in claim 11, wherein the adhesive is applied by using a silk-screening process.

13. A method for making an illuminated display as recited in claim 11, wherein the adhesive is dyed to produce a colored image.

14. A method for making an illuminated display as recited in claim 11, wherein the light-transmitting particles are of various colors and are applied in an arrangement providing a multicolored image.

* * * * *